United States Patent [19]
Thompson

[11] Patent Number: 4,733,492
[45] Date of Patent: Mar. 29, 1988

[54] DOWNRIGGER FISHING SYSTEM AND RELEASABLE CONNECTION

[76] Inventor: Hobert A. Thompson, 3373 Willamette Dr., North, Salem, Oreg. 97303

[21] Appl. No.: 604,368

[22] Filed: Apr. 26, 1984

[51] Int. Cl.[4] ............................................. A01K 95/00
[52] U.S. Cl. .................................. 43/27.4; 43/43.12; 43/43.13
[58] Field of Search ................... 43/27.4, 43.12, 43.13; 24/129 R

[56] References Cited

U.S. PATENT DOCUMENTS

| | | | |
|---|---|---|---|
| 1,378,225 | 5/1921 | Goldman | 24/129 R |
| 2,545,185 | 3/1951 | Winslow | 43/4 |
| 2,562,054 | 7/1951 | Mathieu | 43/43.12 |
| 2,687,592 | 8/1954 | Purcell | 43/43.12 |
| 2,830,400 | 4/1958 | Perry | 43/43.12 |
| 2,977,709 | 4/1961 | Keiter | 43/43.13 |
| 3,023,537 | 3/1962 | Madson | 43/43.13 |
| 3,229,408 | 1/1966 | Kohfield | 43/43.1 |
| 3,353,232 | 11/1967 | Brownson | 24/129 R |
| 3,628,274 | 12/1971 | Wojarn | 43/43.12 |
| 3,641,700 | 2/1972 | Harrison | 43/43.12 |
| 3,861,074 | 1/1975 | Wood | 43/43.12 |
| 3,925,920 | 12/1975 | Walker | 43/43.12 |
| 3,930,330 | 1/1976 | Black | 43/17 |
| 3,939,595 | 2/1976 | Lockett | 43/43.12 |
| 3,974,589 | 8/1976 | Henze et al. | 43/43.12 |
| 4,012,863 | 3/1977 | Lori | 43/43.12 |
| 4,065,869 | 1/1978 | Berry | 43/43.12 |
| 4,212,127 | 7/1980 | Daniels | 43/43.12 |

*Primary Examiner*—Kurt Rowan
*Attorney, Agent, or Firm*—Delbert J. Barnard

[57] ABSTRACT

A downrigger fishing system (14, 24, 36, 48) and a releasable connection in which a rudder plate (24) has a finger (50) in a rearward position and an eye member (74) is engaged with a fishing line (68), the eye member having a forward eye (86, 114) bounded at its front by a bight portion (104, 122) which is loosely fitted within a slot (60) forwardly of the finger (50). The bight portion (104, 122) has a rearwardly directed inner surface which makes substantially a point contact (106) with the forward edge (56) of the finger. The rudder plate (24) has connector means at its upper (28, 30, 32) and lower (40, 42, 44) ends that provide for selective engagements with upper (14) and lower (36) lines of the downrigger to vary the ease of disengagement of the eye conductor (74) from the finger (50) for situations where ambient conditions require greater or easier release of the eye connector from the finger.

30 Claims, 12 Drawing Figures

U.S. Patent  Mar. 29, 1988  Sheet 1 of 3  4,733,492
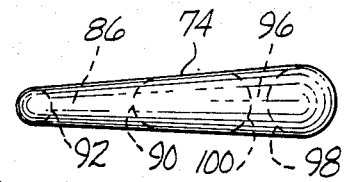
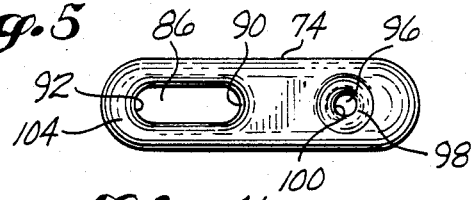
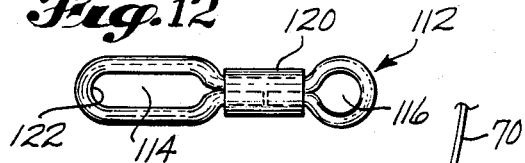
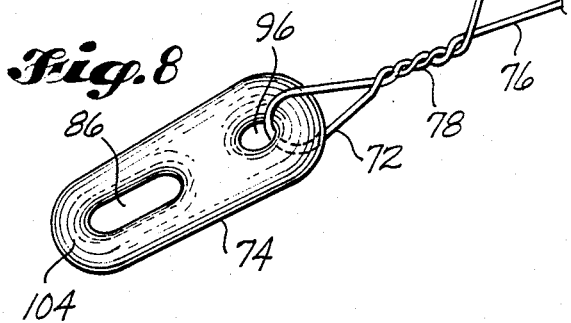
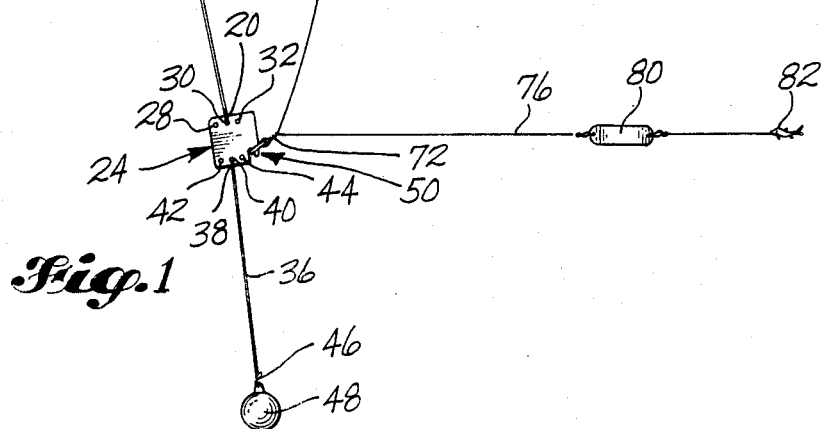

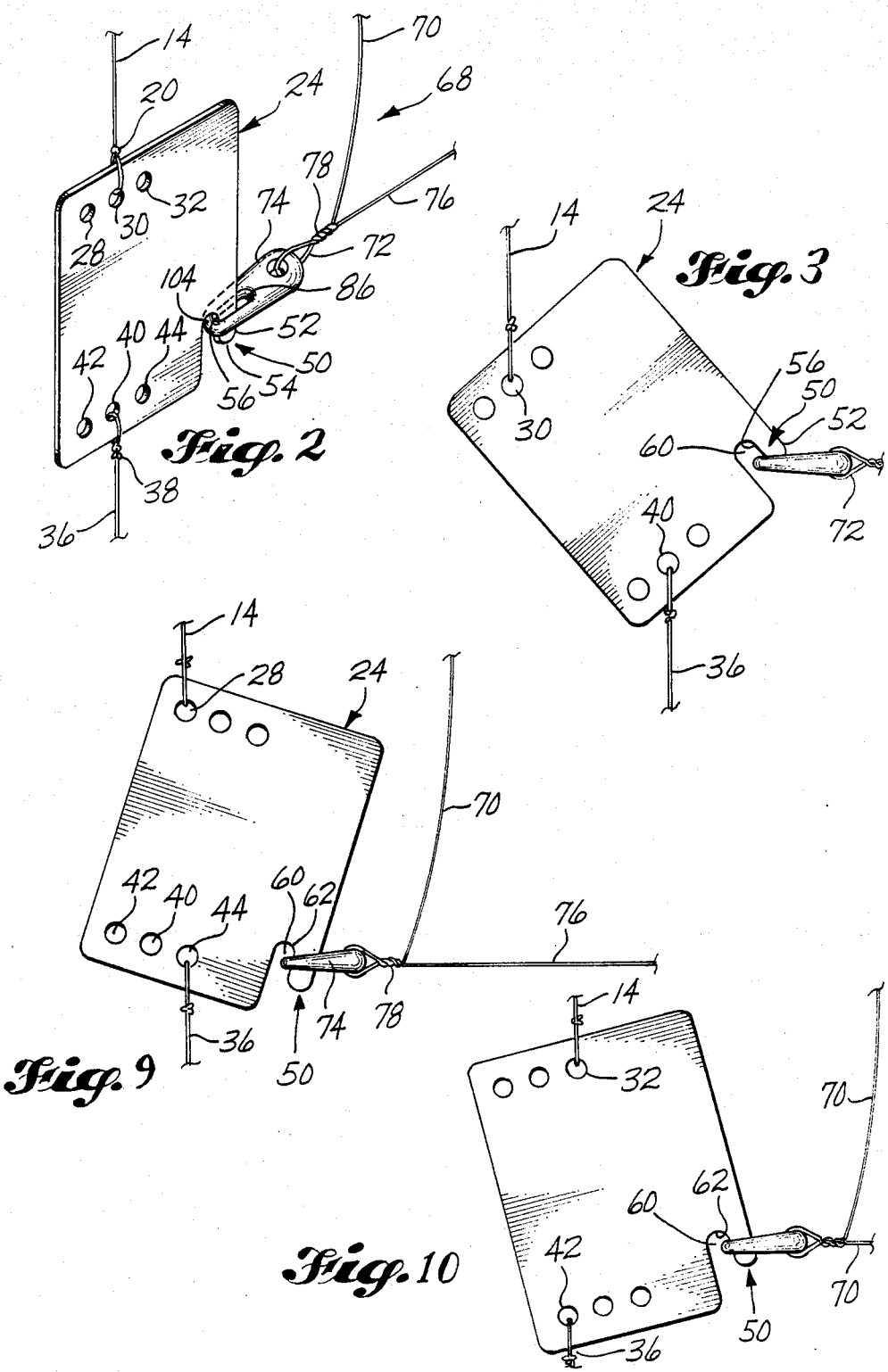

4,733,492

DOWNRIGGER FISHING SYSTEM AND RELEASABLE CONNECTION

TECHNICAL FIELD

The invention relates to a downrigger fishing system and a releasable connection for attaching a fishing line to the downrigger line at a predetermined depth. Downriggers are typically used for deep fishing while trolling or when the water is flowing relative to a fishing line.

BACKGROUND ART

In deep water sport fishing a heavy weight is employed at the end of a downrigger cable and a connection device is provided to hold the fishing line to the downrigger at a desired deep level in the water. A release device is required to free the fishing line from the downrigger line when a strike occurs. In the prior art these devices have generally been mechanically complicated or magnetic. Some of the devices have been subject to corrosion, others either failed to release or release too easily. Where the devices hold the fishing line too securely, there is a tendency to break the line when a strike occurs and this requires the use of excessively heavy lines to avoid their breakage.

A search of the patent literature disclosed a number of devices for releasing the line when a strike occurs. For example, U.S. Pat. No. 4,012,863 to Lori shows a relatively complicated releasable device and also one that appears to be subject to be released too easily from the downrigger.

The following patents, found in the search, are of general interest:

| U.S. Pat. No. | Name |
| --- | --- |
| 2,545,185 | Winslow |
| 2,562,054 | Mathieu |
| 2,687,592 | Purcell |
| 2,830,400 | Perry |
| 3,229,408 | Kohfield |
| 3,614,700 | Harrison |
| 3,628,274 | Wojahn |
| 3,861,074 | Wood |
| 3,925,920 | Walker |
| 3,930,330 | Black |
| 3,939,595 | Lockett |
| 3,974,589 | Henze et al. |
| 4,065,869 | Berry |
| 4,212,127 | Daniels. |

DISCLOSURE OF THE INVENTION

The invention is a downrigger release system and an improved releasable connection between a downrigger line and a fishing line.

The invention includes a rudder plate having upper and lower end portions, the upper end being connectable to the lower end of an upper downrigger line, extending downwardly from a boat to the rudder plate, and a lower line having its upper end connected to the lower end of the rudder plate and having its lower end connected to a downrigger weight or kite. The rudder plate has a downwardly opening blind slot in a lower rear or trailing portion. A downwardly extending finger is positioned immediately rearwardly or trailingly of the slot, the finger having a generally straight forward or leading edge and having a trailing edge extending along and below the trailing edge of the rudder plate.

An eye member or trigger has a forward connector eye bounded at its front or leading edge by a bight portion, sized to fit loosely within the slot. The bight portion includes a rearwardly directed inner surface which makes substantially a point contact with the forward edge of the finger when the bight portion of the forward connector eye is within the slot and the finger is within the forward connector eye.

The eye member includes a second eye or opening in a rear or trailing portion of the eye for receiving the fishing line. The fishing is taut between the eye connector and the pole and the line is twisted at a location spaced from the hook, adjacent the eye member to prevent relative sliding movement of the fishing line through the rearward connector eye.

The rudder plate has a plurality of selectively usable connector holes spaced apart along the upper portion and along the lower portion so that the location of the downrigger line to the rudder plate can be changed relative to the rudder plate for changing the slope of the forward or leading edge of the finger. The upper and lower connector means are positioned so that the forward edge of the finger may be held substantially parallel between an imaginary line which extends between the upper and lower connector means, so that the forward edge of the finger leans rearwardly relative to an imaginary line extending between the upper and lower connector means, and so that the forward edge of the finger leans relatively forwardly to an imaginary line extending between the upper and lower connector means. These variations make the hook end of the line easier or harder to release from the finger which forms an inverted hook.

The substantial point contact between the inner surface of the bight portion of the forward eye and the forward edge of the finger is normally upwardly within the slot a great distance relative to the length of the point contact and the lengths of the slot and finger. This provides a low friction holding arrangement with great security against improper release, that is, release without a strike. Typically, when the fishing hook and lure are extending substantially directly toward the rear, as the result of relative movement between the downrigger and the water, there is a direct pull of the hook end of the line on the leading edge of the finger through the eye connector. Thus, temporary lateral movement or temporary inadvertent tilting in the plane of the rudder plate will not cause the eye connector to be released from the finger because the fishing line is normally taut. That is, no mechanical advantage is created to release the eye connector by such lateral movement or tilting.

The taut fishing line holds the eye connector in an upper position relative to the upper end of the downwardly opening slot along the finger. Thus, as the downrigger is moved by trolling or by the force of water, the fishing line is held securely to the rudder plate but when a strike occurs on the hook, the rudder is tilted so that the forward edge of the finger is slanted toward the downrigger line, and the low resistance of the substantial point contact, of the bight of the eye connector on the finger edge, allows the eye connector to slip off of the finger and free the line so that the fish on the hook can be played. The tilt caused by a strike is permanent until the fishing line is released.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is an elevational view of a downrigger fishing system according to the invention;

FIG. 2 is an enlarged view of a rudder plate illustrating the connection to the fishing line;

FIG. 3 is a view of the rudder plate shown in FIG. 2, illustrating the release of the fishing line connection from the plate when a strike occurs;

FIG. 4 is an enlarged side view of a trigger or eye connector for engaging the fishing line with the rudder plate as indicated in FIGS. 2 and 3;

FIG. 5 is a plan view of the eye connector shown in FIG. 4;

FIG. 8 is a view illustrating the connection between the eye connector and the fishing line;

FIG. 9 is an elevational view of the rudder connected to upper and lower downrigger lines so that a forward surface on the finger extends rearwardly relative to an imaginary line between the connection points of the downrigger lines on the rudder plate;

FIG. 10 is an elevational view of a rudder plate connected to the upper and lower downrigger lines so that the forward surface on the finger extends forwardly relative to an imaginary line between the connection points of the downrigger lines on the rudder plate;

FIG. 11 is an end view of another embodiment of a trigger or eye connector; and

FIG. 12 is a plan view of the eye connector shown in FIG. 11.

BEST MODE FOR CARRYING OUT THE INVENTION

Figure 6:
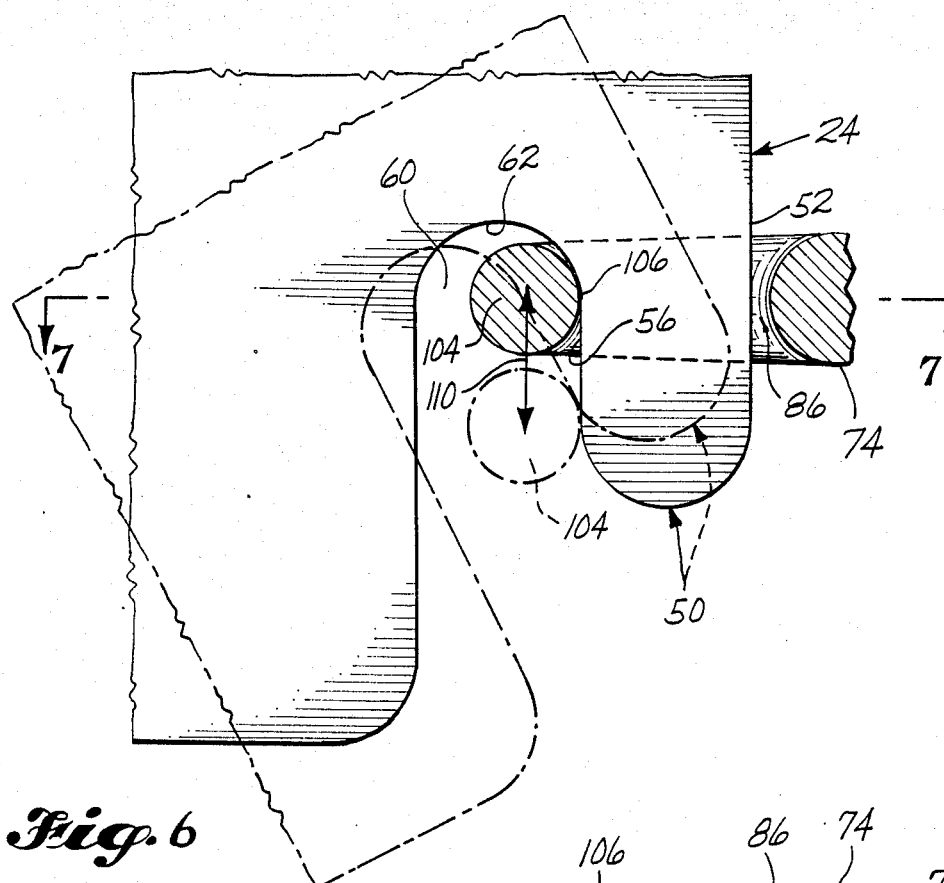
FIG. 6 is an enlarged fragmentary view illustrating the normal engagement of the eye connector with a finger on the rudder plate and the movement toward the release when a strike occurs.

Referring again to the drawings, there is shown in FIG. 1, the aft end of a boat 10 having an upper end 12 of a downrigger upper line 14 secured to a winch 16. The lower end 20 of the upper line 14 is secured to a rudder plate 24 at one of three spaced upper end connections in the form of holes 28, 30, and 32. As best seen in FIG. 2, the specific connection is to a central hole 30.

A lower downrigger line 36 has its upper end 38 connected to a central hole 40 of three spaced lower connection holes 42, 40, and 44. Connected to the lower end 46 of the lower downrigger line is a weight 48 which holds the rudder plate 24 at a desired depth in the water. As shown in FIG. 1, relative movement between the downrigger lines and the water is holding the downrigger system rearwardly with respect to the boat.

Upwardly of the lower end of the rudder plate and the lower spaced connections is a downwardly extending member or finger, generally designated as 50. The finger 50 has a rearward or trailing edge 52 extending along the rearward edge of the rudder plate 24, has a bottom or lower end 54, and has a forward or leading edge 56. Forwardly of the leading edge 56 is a blind slot 60, having its closed end 62 extending above the lower connection means 40, 42, and 44.

As shown in FIG. 1, a fishing rod 66 is secured to the rear of the boat and a fishing line, generally designated as 68 has an upper end 70 extending from the pole 66, having a lower end 72 engaged with an eye connector 74, and having a lure and hook portion 76 generally trailing from the eye connector 74, engaged with the finger 50. The lure is indicated as 80 and the hook 82. Where the fishing is by trolling or where the water is moving relative to the boat, the lure 80 and hook 82 typically trail as shown in FIG. 1.

The eye connector or trigger 74 is shown in detail in FIGS. 2, 4, 5, and 8. A forward eye or slot 86 has convex curves 90 and 92 at its rearward and forward ends, FIG. 4, and a rearward or trailing eye or opening 96 also has rearward and forward convex curves around the opening.

The fishing line is secured, FIG. 8, to the eye connector 74 in the eye 96, against relative sliding of the line and the connector, by means of a series of twists 78.

Figure 7:
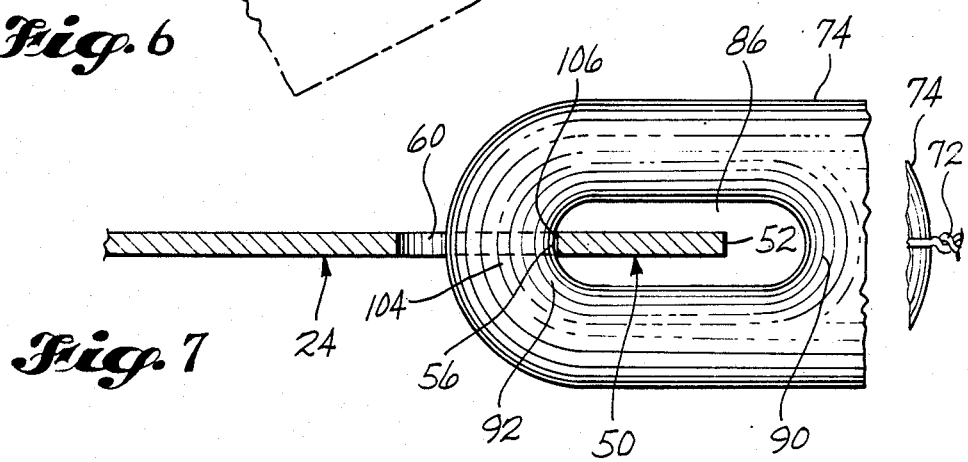
FIG. 7 is a partially cross sectional plan view illustrating a substantial point connection between the trigger and the finger on the rudder plate, taken along the lines 7—7 in FIG. 6.

As shown in FIGS. 2, 6 and 7, a forward bight portion 104, formed at the front of the eye opening 86, fits loosely within the slot 60 and its inner surface makes substantially a point contact 106 with the forward edge 56 of the finger.

Selective connections of the downrigger lines to the holes 28, 30, 32 and 40, 42, and 44 vary the ease of disengagement of the eye connector 74 from the finger 50. In normal operation, depending upon the speed of relative movement between the lines and the water, the upper downrigger line 14 could be secured to the connection hole 30 and the lower downrigger line 36 could be secured to the connection opening 40, as shown in FIGS. 1-3. In this situation the forward edge 56 of the finger is parallel to an imaginary line between the connection openings 30 and 40 and there is no relative tilting between imaginary line and the forward finger surface. In FIG. 3, the rudder plate 24 and the forward finger surface 56 are both tilted, as would occur when there is a strike. The tilting is caused by increased pull on the line portion 76, causing the trigger or eye connector 74 to pull on the forward surface 56 of the finger so that the eye 86 slides down the finger and off thereof.

In FIG. 9 the upper downrigger line 14 is connected to the hole 28 and the lower downrigger line 36 is connected to the hole 44. In this arrangement a greater pull by the fish on the line 76 and on the trigger 74, than in the arrangement in FIG. 3, is required to tilt the rudder plate and finger 50 sufficiently to cause the eye 86 to slip off of the finger.

In FIG. 10 the upper downrigger line is secured to the hole 32 and the lower downrigger line is secured to the hole 42 and in this selective arrangement less pull is required by the fish on the trigger 74 to tilt the finger and rudder plate so that the eye 86 is disengaged from the finger. In FIG. 9 the selective connection is such that the forward edge of the finger leans rearwardly relative to an imaginary line between the connecting means 28 and 44 and in FIG. 10 the selective connection is such so that the forward edge of the finger leans forwardly relative to an imaginary line between the connection means 32 and the connection means 42.

To set up the downrigger system, according to the invention, as shown in FIG. 1, the weight 48 is lowered a short distance over the side of the boat. The trigger 74 is held in one hand and 15 to 40 feet of fishing line are drawn through the eye 96. The lure 80 and hook 82 are then attached to the distal end of the line portion 76.

The trigger is rotated about six times relative to the fishing line to form the holding twists 78.

The trigger is then attached to the rudder, slipping the eye 86 onto the finger 50. The downrigger line or cable 14, 36 is lowered to the desired depth, maintaining tension on the fishing line to hold the trigger on the finger 50. As indicated when a relatively large fish bites or strikes the hook, the rudder will be tilted and the trigger will slip off the finger. The twists 78 unwind and the trigger is free to slide on the fishing line.

To otherwise release the trigger, the downrigger cable is cranked upwardly until the rod 66 springs upwardly. When this occurs, the trigger and lure have been released from the rudder.

Irrespective of the selective arrangements of the connector means 28, 30, and 32, and 40, 42, and 44 with the upper and lower downrigger lines, respectively, the positioning of the bight 104 relative to the forward edge 56 of the finger is as shown in FIGS. 6 and 7. Because the bight portion 104 loosely fits within the slot and makes substantially a point contact with the forward edge of the finger, there is always a direct pull, as generally indicated in FIG. 1 and specifically indicated in FIG. 7, of the fishing line 76 and the eye connector on the finger so that temporary relative movements between the finger and the bight 104 will not cause the trigger to slip off of the finger. That is, lateral movements of the rudder plate relative to the eye connector 74 or temporary inadvertent tilting in the plane of the rudder plate will not cause the eye connector to be released from the finger.

The tautness of the fishing line holds the eye connector upwardly in the slot a great distance relative to the thickness of the point connection at 106 and the lengths of the slot and finger. The arrow 110 in FIG. 6 indicates the amount of movement possible along the surface of the finger that can occur without causing the eye connector to be pulled off of the finger.

Thus, temporary movements, not caused by a strike, relative to the eye connector and the rudder plate do not cause a moment arm or other mechanical advantage to be created so as to allow easy release of the eye connector. For example, it may be understood from a study of FIG. 7 that twisting movements of the finger at 106 would not be significant so as to change the relative positions of the eye connector and the finger. Similarly, the temporary tilting of the rudder plate would not affect the point contact at 106 so as to cause the eye connector to be released from the finger. The arrangement is such that only a sustained pull resulting from a strike would sufficiently tilt the finger to cause the eye connector to be disengaged therefrom. This action is indicated in FIG. 3. As shown in FIG. 6 in broken lines, the positions of the finger in the tilted position and of the bight 104 indicated that a greater amount of tilting is required to cause the eye connector and finger to become disengaged.

However, it should be noted that the low friction substantial point connection permits an ease of disengagement by a strike.

In FIGS. 11 and 12 another embodiment of a trigger or eye connector, generally designated as 112, is shown. It is formed of wire and has a forward eye 114 for sliding on the finger 50 and has a rearward eye 116 for the fishing line. The wire is crimped together at 120 with a flattened plate. The forward eye 114 has inner convex surfaces at 122 to make substantially a point contact on the forward surface 56 of the finger.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. For use in a downrigger system, an improved releasable connection between a downrigger line and a fishing line, comprising:

a rudder plate having an upper end portion connectable to the lower end of an upper downrigger line extending downwardly from a boat to the rudder plate, a lower end portion connectable to the upper end of a lower downrigger line extending from the rudder plate to a downrigger weight or kite located below the rudder plate, a downwardly opening blind slot in a lower rear portion of the rudder plate, and a downwardly extending finger positioned immediately rearwardly of the slot, said finger having a generally straight forward edge; and an eye member connectable at its rear to a fishing line and having a forward connector eye bounded at its front by a bight portion of the eye member which is sized to loosely fit within said slot, said bight portion including a rearwardly directed inner surface which makes contact with the forward edge of said finger when the bight portion of the forward connector eye is within said slot and the finger is within the forward connector eye.

2. A releasable connection according to claim 1, wherein said inner surface of said bight portion makes substantially a point contact with the forward edge of said finger.

3. A releasable connection according to claim 1, wherein the eye member includes a second eye opening in a rear portion of the eye member for receiving the fishing line.

4. A releasable connection according to claim 1, comprising a plurality of selectively usuable connector means spaced apart along the upper portion of the rudder plate, so that the location of connection of the upper downrigger line to the rudder plate can be changed relative to the location of connection of the lower downrigger line to the rudder plate, for changing the slope of the forward edge of the finger.

5. A releasable connection according to claim 4, wherein said inner surface of said bight portion makes substantially a point contact with the forward edge of said finger.

6. A releasable connection according to claim 1, comprising a plurality of connector means spaced apart along the lower portion of the rudder plate, so that the connection of the lower downrigger line to the rudder plate can be changed relative to the connection of the upper downrigger line of the rudder plate, for changing the slope of the forward edge of the finger.

7. A releasable connection according to claim 6, wherein said inner surface of said bight portion makes substantially a point contact with the forward edge of said finger.

8. A release mechanism according to claim 1, comprising a plurality of selectively usable connector means spaced apart along the upper portion of the rudder plate, and a plurality of selectively usable connector means spaced apart along the lower portion of the rudder plate, so that the slope of the forward edge of the finger can be adjusted by changing the choice of connector means at the upper and lower portions of the rudder plate.

9. A releasable connection according to claim 8, wherein said inner surface of said bight portion makes substantially a point contact with the forward edge of said finger.

10. A releasable connection according to claim 1, comprising an upper connector means for the upper downrigger line and a lower connector means for the lower downrigger line, with the forward edge of said finger being substantially parallel to an imaginary line which extends between the two connector means.

11. A releasable connection according to claim 1, comprising an upper connector means at the upper portion of said rudder plate and a lower connector means at the lower portion of said rudder plate, with the forward edge of said finger leaning rearwardly relative to an imaginary line extending between the two connector means.

12. A releasable connection according to claim 1, comprising an upper connector means at the upper portion of said rudder plate and a lower connector means at the lower portion of said rudder plate, with the forward edge of said finger leaning forwardly relative to an imaginary line extending between the two connector means.

13. A releasable connection according to claim 2, wherein said substantial point contact is normally upwardly within said slot a great distance relative to the length of the point contact and the lengths of the slot and finger.

14. A releasable connection according to claim 1, wherein said eye member comprises a second eye opening through which the fishing line extends, said second eye opening being constructed to enable the eye member to be secured in place relative to the fishing line by a simple rotation of the eye member to twist the fishing line, prior to placing the finger on the rudder plate in the forward connector eye.

15. A releasable connection according to claim 2, wherein said eye member comprises a second eye opening through which the fishing line extends, said second eye opening being constructed to enable the eye member to be secured in place relative to the fishing line by a simple rotation of the eye member to twist the fishing line, prior to placing the finger on the rudder plate in the forward connector eye.

16. A releasable connection according to claim 4, wherein said eye member comprises a second eye opening through which the fishing line extends, said second eye opening being constructed to enable the eye member to be secured in place relative to the fishing line by a simple rotation of the eye member to twist the fishing line, prior to placing the finger on the rudder plate in the forward connector eye.

17. A downrigger fishing system, comprising:
a rudder plate which in use is submerged in water;
an upper downrigger line which in use extends downwardly from a boat to the rudder plate;
upper connector means for connecting the lower end of the upper downrigger line to an upper portion of the rudder plate;
a lower downrigger line extending downwardly from the rudder plate to a downrigger weight or kite located below the rudder plate;
lower connector means for connecting the upper end of the lower downrigger line to a lower portion of the rudder plate;
wherein in use, tension in the upper and lower downrigger lines will hold the rudder plate substantially vertical;
said rudder plate including a downwardly opening blind slot in a lower rear portion of the rudder plate, and a downwardly extending finger positioned immediately rearwardly of the slot, said finger having a generally straight forward edge;
a fishing line which in use extends downwardly from the boat to the fishing hook;
an eye member having a forward connector eye and a rearward connector eye;
said fishing line extending through the rearward connector eye, and said fishing line being twisted at a location spaced from the hook, in the immediate vicinity of the eye member, for preventing relative sliding movement of the fishing line through the rearward connector eye; and
said forward connector eye being bounded at its front by a bight portion of the eye member which is sized to loosely fit within the slot in the rudder plate, said bight portion including a rearwardly directed inner surface which makes contact with the forward edge of said finger when the bight portion of the forward connector eye is within said slot and the finger is within the forward connector eye.

18. A downrigger fishing system according to claim 13, wherein the forward edge of the finger leans rearwardly from an imaginary line extending between the upper and lower connector means.

19. A downrigger fishing system according to claim 17, wherein the inner surface of said bight portion makes substantially a point contact with the forward edge of the finger.

20. A downrigger fishing system according to claim 19, wherein the forward edge of the finger leans forwardly from an imaginary line extending between the upper and lower connector means.

21. A downrigger fishing system according to claim 20, wherein the inner surface of said bight portion makes substantially a point contact with the forward edge of the finger.

22. A downrigger fishing system according to claim 19, wherein said substantial point contact is normally upwardly within said slot a great distance relative to the length of the point contact and the lengths of the slot and finger.

23. A downrigger release system, comprising:
a downrigger line assembly including an upper support line for being supportedly connected at an upper end and having a lower end connected to an upper end of a rudder plate, a weight support line having an upper end connected to a lower end of the rudder plate and having its lower end connected to a weight;
a trailing end on said rudder having a downwardly directed member formed to releasably engage means on a taut fishing line;
connection means on said rudder plate for connecting at least one of said support lines to vary the ease of releasability of said means on said taut fishing line;

said downwardly directed member having a downwardly directed trailing edge and a downwardly directed leading edge;

said rudder plate being relieved in the leading direction from said leading edge to form a space in a leading position with respect to said member;

said means on said taut fishing line having a body having a first opening to fit on said member with a portion of the body extending into said space;

said body having a second opening to receive said fishing line; and said fishing line being twisted with respect to said second opening when said body portion extends into said space.

24. The invention according to claim 23 in which:
said connection means on said rudder plate are adjacent to the upper and lower ends of the plate for connecting to both of said support lines.

25. The invention according to claim 21 in which:
said connection means adjacent to each end of said rudder plate are spaced from a leading to a trailing direction.

26. The invention according to claim 22 in which:
said connection means adjacent ot each end of said rudder plate are a plurality of holes through the rudder plate for fastening the support lines therethrough;
one of said support lines being fastened through a hole adjacent to the upper end and the other support line being fastened through a hole adjacent to the lower end.

27. The invention according to claim 23 in which:
holes adjacent the upper end are generally vertically aligned with respective holes adjacent the lower end.

28. The invention according to claim 23 in which:
said leading and trailing edges of said downwardly directed member terminate in a bottom edge, spaced from said lower end of said rudder plate, upwardly from said holes adjacent said lower end.

29. A downrigger release system, comprising:
a downrigger line assembly including an upper support line for being supportedly connected at an upper end and having a lower end connected to an upper end of a rudder plate, a weight support line having an upper end connected to a lower end of the rudder plate and having its lower end connected to a weight;

a trailing end on said rudder having a downwardly directed member formed to releasably engage means on a taut fishing line;

connection means on said rudder plate adjacent to the upper and lower ends of the plate for connecting to both of said support lines to vary the ease of releasability of said means on said taut fishing line;

wherein said connection means adjacent to each end of said rudder plate are a plurality of holes through the rudder plate spaced from a leading to a trailing direction;

one of said support lines being fastened through a hole adjacent to the upper end and the other support line being fastened through a hole adjacent to the lower end;

wherein the holes adjacent the upper end are generally vertically aligned with respective holes adjacent the lower end;

said downwardly directed member having a downwardly directed trailing edge and a downwardly directed leading edge;

said rudder plate being relieved in the leading direction from said leading edge to form a space in a leading position with respect to said member;

said means on said taut fishing line having a body having a first opening to fit on said member with a portion of the body extending into said space;

said body having a second opening to receive said fishing line; and said fishing line being twisted with respect to said second opening when said body portion extends into said space.

30. A downrigger release system, comprising:
a downrigger line assembly including an upper support line for being supportedly connected at an upper end and having a lower end connected to an upper end of a rudder plate, a weight support line having an upper end connected to a lower end of the rudder plate and having its lower end connected to a weight;

a trailing end on said rudder having a downwardly directed member formed to releasably engage means on a taut fishing line;

connection means on said rudder plate for connecting at least one of said support lines to vary the ease of releasability of said means on said taut fishing line;

wherein said downwardly directed member is a finger having a trailing edge forming a portion of said trailing end of said rudder;

said finger having a bottom edge and having a leading edge extending upwardly from the bottom edge inwardly of the trailing end;

a downwardly opening blind slot in said rudder plate formed along said leading edge of said finger;

said means on said taut fishing line being a connector having a leading opening and trailing opening;

the leading opening being formed to receive said finger, a portion of the connector forming the leading opening extending into said slot, and an inner surface of the opening making substantially a point contact with a leading edge of the finger; and the fishing line extending through said trailing opening and being twisted adjacent the eye member for preventing relative sliding movement of the fishing line through the trailing opening.

* * * * *